United States Patent [19]

Ohtani et al.

[11] Patent Number: 4,978,414

[45] Date of Patent: Dec. 18, 1990

[54] APPARATUS FOR STRETCHING SILK INCLUDING MEANS TO MOVE CRAMP MEMBERS INDEPENDENTLY OF EACH OTHER

[75] Inventors: Yasuaki Ohtani; Isamu Kubo; Kohji Ohtake; Kazuo Hayashi, all of Isesaki, Japan

[73] Assignees: Nippon CMK Corp.; Iwase Sangyo Co.; Itohdenki Kanto Hanbai Co., all of Isesaki, Japan

[21] Appl. No.: 815,212

[22] Filed: Dec. 31, 1985

[30] Foreign Application Priority Data

| | | | |
|---|---|---|---|
| Jan. 18, 1985 | [JP] | Japan | 60-7252 |
| Oct. 24, 1985 | [JP] | Japan | 60-238439 |
| Oct. 28, 1985 | [JP] | Japan | 60-240806 |
| Oct. 29, 1985 | [JP] | Japan | 60-241823 |

[51] Int. Cl.[5] .......... B29C 65/52

[52] U.S. Cl. .......... 156/494; 38/102.4; 101/127.1

[58] Field of Search .......... 38/102, 102.1, 102.2, 38/102.5, 102.91; 101/126–127, 127.1, 128.4; 430/308; 427/282, 143; 254/199, 251; 140/123.5; 160/371, 378, 101–105, 368 R, 354; 198/412, 394; 414/774–775, 783; 269/32, 238; 156/229, 160, 267, 275.1, 273.3, 308.4, 494, 496, 499, 556, 561, 578, 299, 523

[56] References Cited

U.S. PATENT DOCUMENTS

| | | | |
|---|---|---|---|
| 2,608,750 | 9/1952 | Cluzel | 101/127.1 |
| 2,655,865 | 10/1953 | Geiringer | 156/578 |
| 2,759,217 | 8/1956 | Peterson | 38/102.5 |
| 3,315,301 | 4/1967 | Dibblee | 26/1 |
| 3,361,612 | 1/1968 | Rowbottam | 156/583.5 |
| 3,414,994 | 12/1968 | Jaccard | 101/127.1 |
| 3,435,258 | 4/1969 | Brennan | 427/143 |
| 3,811,578 | 5/1974 | Jureit | 198/412 |
| 4,040,881 | 8/1977 | Wallace | 156/293 |
| 4,239,576 | 12/1980 | Taki | 156/299 |
| 4,372,802 | 2/1983 | Harigane | 156/556 |
| 4,568,407 | 2/1986 | Barbieri | 156/523 |

*Primary Examiner*—Michael W. Ball
*Assistant Examiner*—Steven D. Maki
*Attorney, Agent, or Firm*—Emmanuel J. Lobato; Robert E. Burns

[57] ABSTRACT

An automatic silk stretching apparatus for stretching silk on a silk screen printing frame is provided. At first silk is stretched to four sides by first stage stretching by cramp table and second stage stretching by stretchers on the cramp table. From lower side of the cramped silk, a printing frame on an elevator table is lifted and urges the silk. Adhesive is applied on the frame, and is forcibly dried. Then, the excess silk surrounding the frame is cut. The silk stretched frame is discharged, an empty frame is fed and further new silk is cramped.

1 Claim, 11 Drawing Sheets

APPARATUS FOR STRETCHING SILK INCLUDING MEANS TO MOVE CRAMP MEMBERS INDEPENDENTLY OF EACH OTHER

BACKGROUND OF THE INVENTION

1. Field of the Invention:

The present invention relates to stretching silk on a frame which is used to silk screen printing process, and more particularly the present invention provides automatic silk stretching method and apparatus.

This fabric which is used in so-called silk screen printing process is not limited to silk. In the specification and claims, "silk" is used to represent such fabric for sake of clarity only, and is not intented to limit the scope of the invention.

2. Description of Prior Art

The silk stretching on the silk screen printing frame has been performed manually.

An empty frame is manually cramped in a holder, and adhesive is applied on upper surface of the frame. Silk is cut to desired dimension and is stretched on the adhesive applied frame surface at a predetermined tension. The silk stretched frame is dried by natural drying in the tension applied state of the silk. All the process has been performed manually.

The process is very cumbersome, and accuracy and efficiency of the operation depend on skilness of operator. Thus, irregularity of stretching frequently occur and efficiency of the operation is normally very low.

The demand for such silk screen printing had been low enough to satisfy the demand by manually stretched silk screen. However, recently demands for many frames of many kinds are increasing. For such demands, manual stretching cannot satisfy. Automatic silk stretching apparatus is requested frequently.

The object of the present invention is to satisfy the request and to provide an automatic silk stretching method and apparatus for stretching silk on a silk screen printing frame efficiently.

Summary of the Invention

To attain the above mentioned object, the method of stretching silk on a silk screen printing frame, according to the present invention, comprises cramping four side portions of a silk at a predetermined tension, urging the frame from lower side of the cramped silk, applying adhesive on the upper surface of the urged frame from upper surface of the stretched silk, forcibly drying the applied adhesive, and cutting the silk along outer periphery of the frame.

The apparatus for stretching silk on a silk screen printing frame, according to the present invention, comprises a silk cramp apparatus including four sides cramp tables surrounding the frame and inwardly and outwardly slidably supported on a stand, and a plurality of cramp members mounted on each cramp table and each having a silk cramp means and means to move the cramp means inwardly and outwardly, a frame elevator apparatus urging the frame from lower side of the silk cramped by the cramp apparatus, an adhesive apply apparatus applying adhesive on the upper surface of the urged frame, a drier apparatus forcibly drying applied adhesive on the frame, and a cutting apparatus cutting the silk along the outer periphery of the frame.

Figure 1:
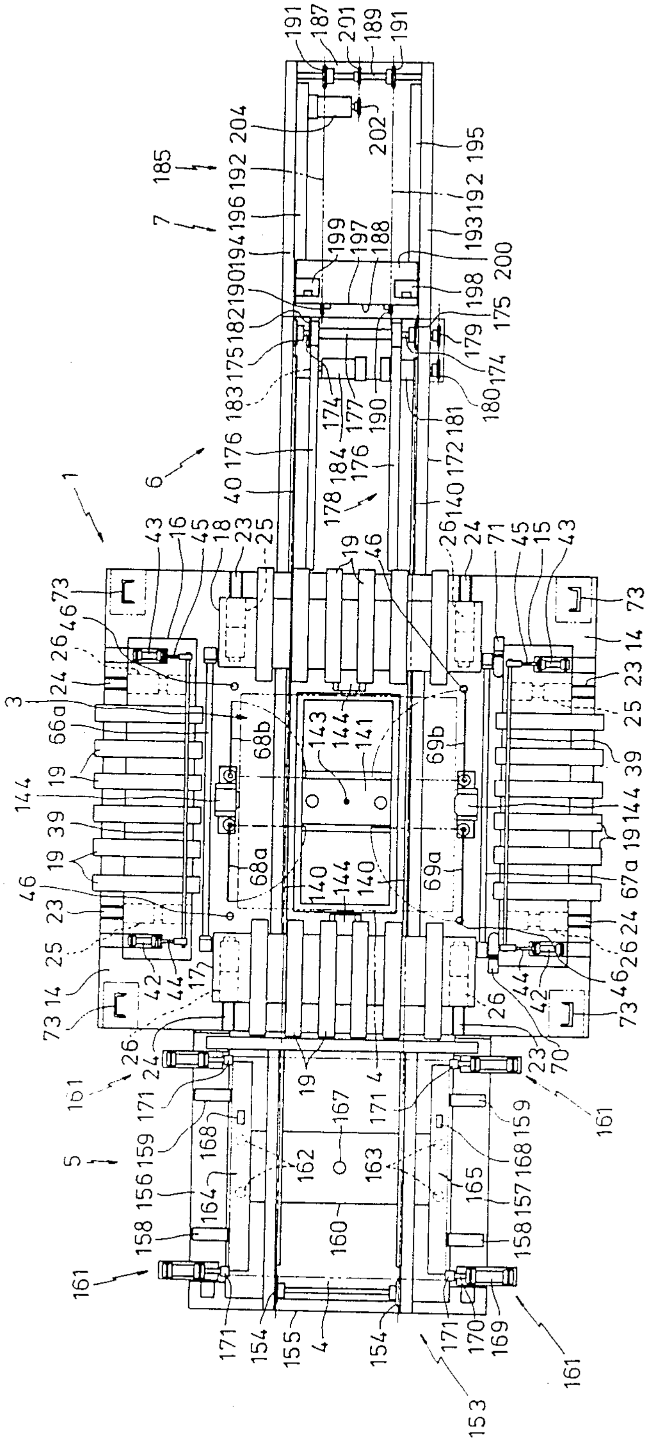
FIG. 1 is a plan view of an automatic silk stretching apparatus, according to the present invention.
Figure 9:
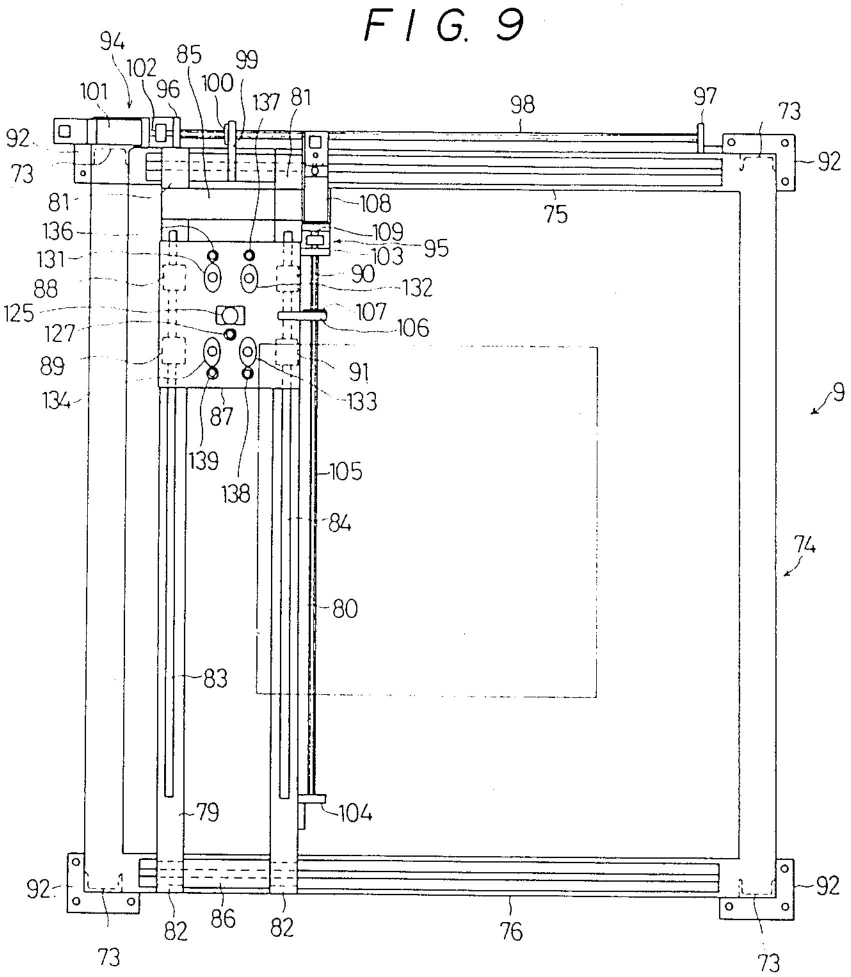
FIG. 9 is an enlarged plan view of a movable table which is movable to X and Y directions and mounts an adhesive apply apparatus, adhesive drier apparatus and silk cutting apparatus, of the apparatus shown in FIG. 1.
Figure 14:
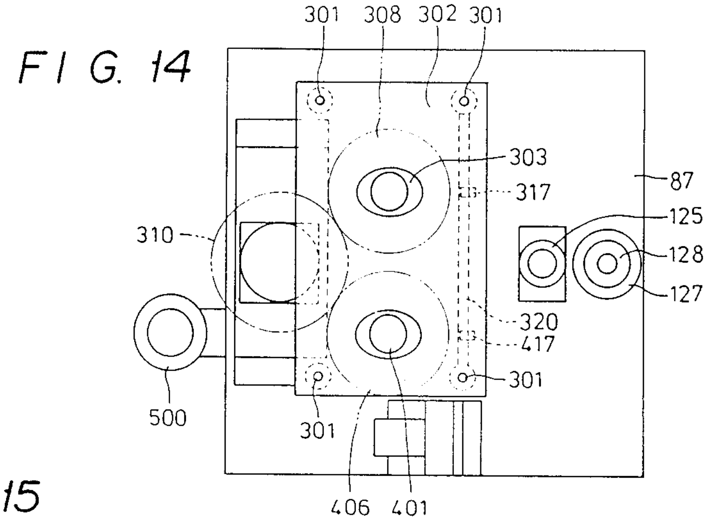
Figure 15:
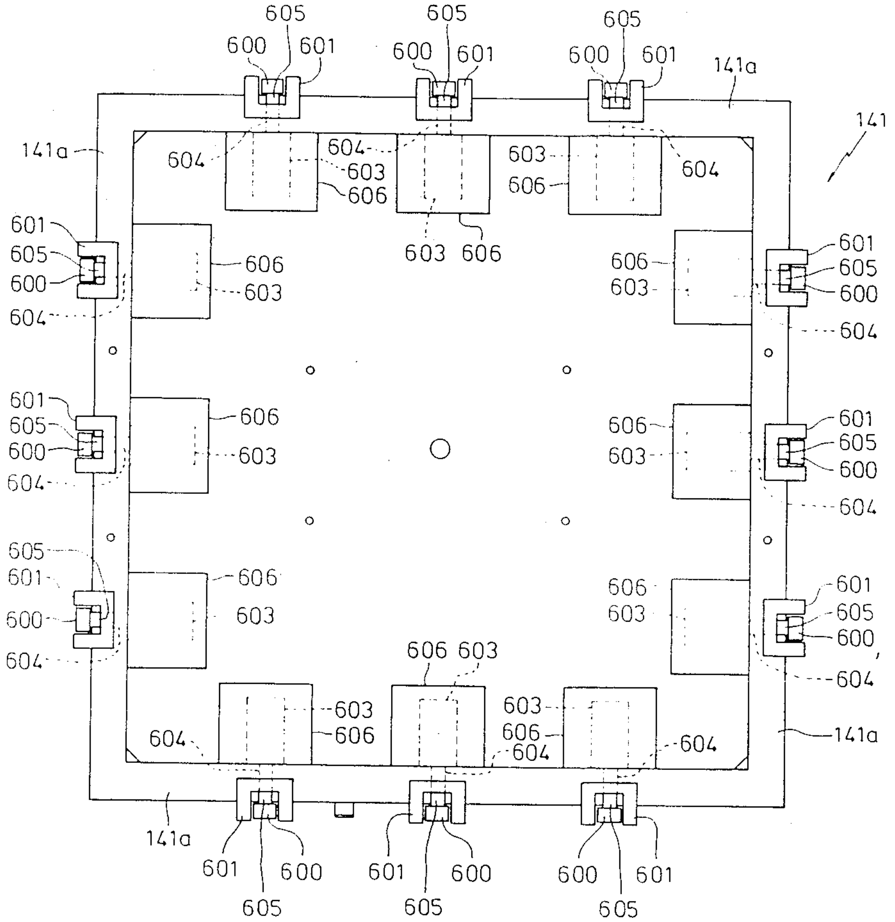
Figure 16:
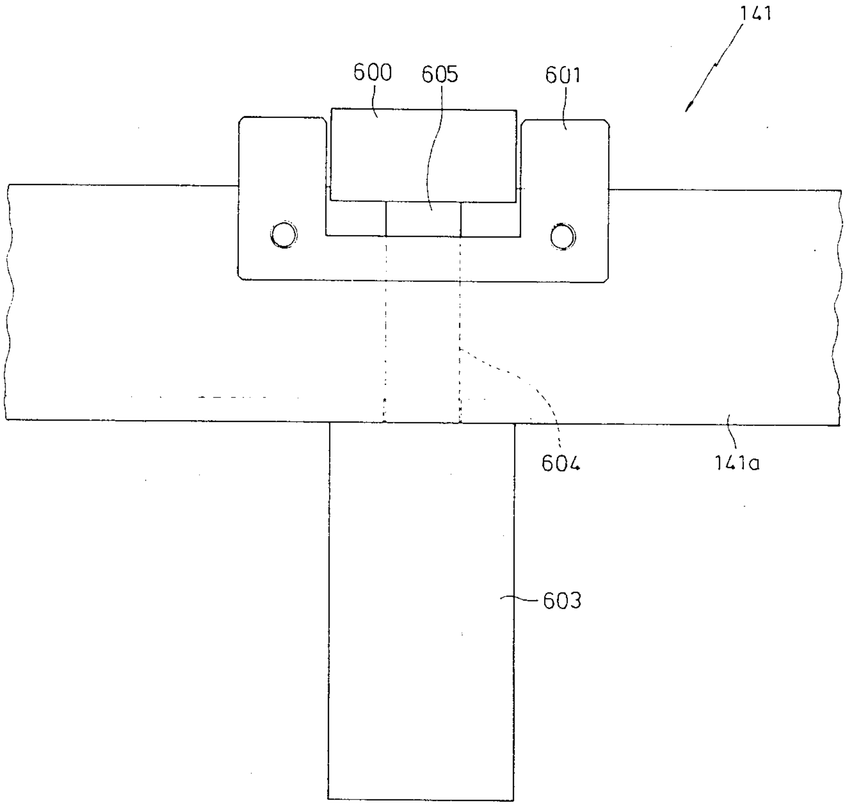
Figure 17:
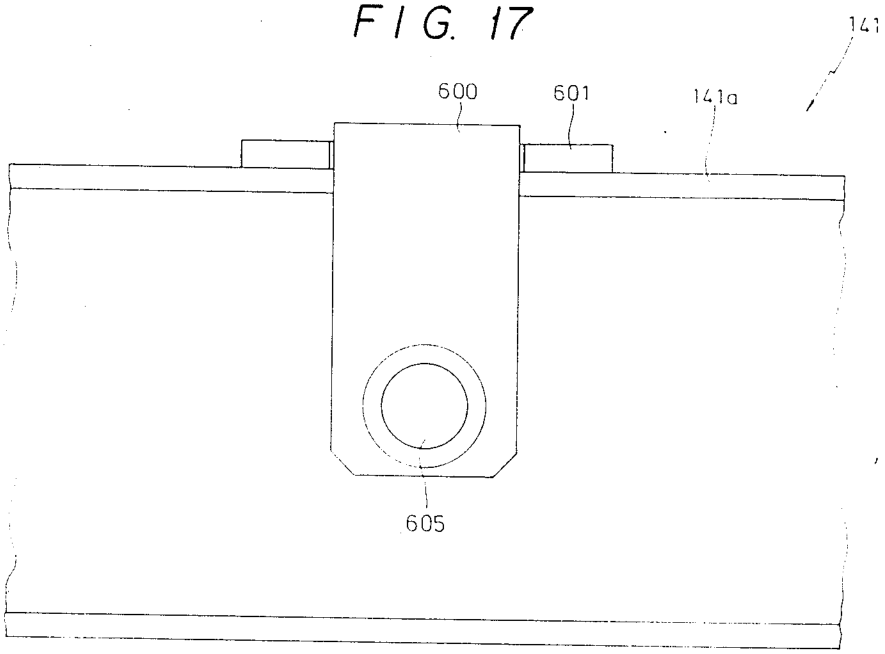

FIG. **13*a* is an enlarged side view of a silk urging apparatus, according to second embodiment of the invention, on the movable table shown in FIG. 9**;

FIG. **13*b* is an enlarged side view of a modified silk cutting apparatus on the movable table shown in FIG. 9**;

FIG. 14 is a plan view of the movable table shown in FIGS. **13*a* and 13*b***;

FIG. 15 is an enlarged plan view of a modified elevator table shown in FIG. 1;

FIG. 16 is a partial enlarged plan view of FIG. 15 showing a strain pawl;

FIG. 17 is an end view of FIG. 16; and

Figure 18:
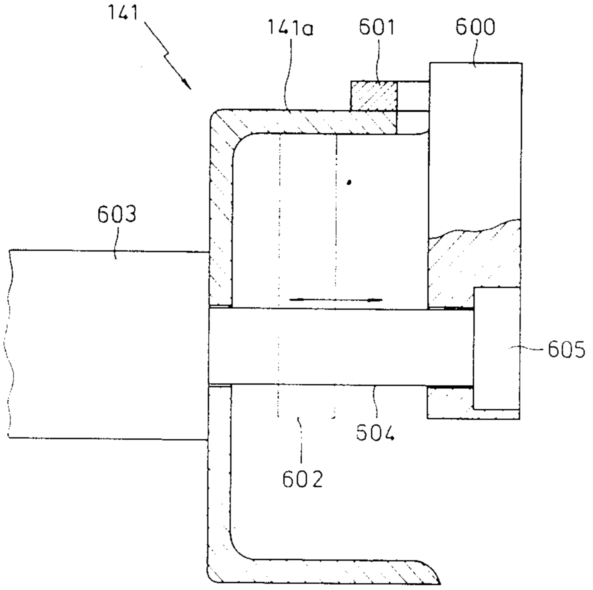

FIG. 18 is a partial sectional enlarged side view of FIG. 15 showing the pawl and an associated cylinder.

DESCRIPTION OF PREFERRED EMBODIMENTS

Figure 2:
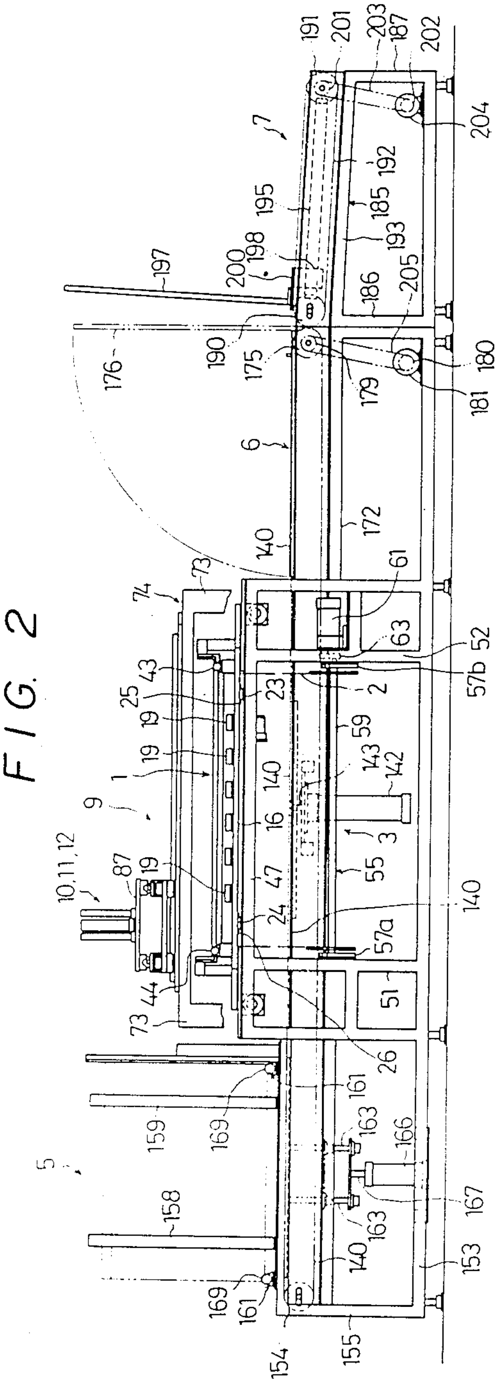
FIG. 2 is a side view of the apparatus shown in FIG. 1.
Figure 3:
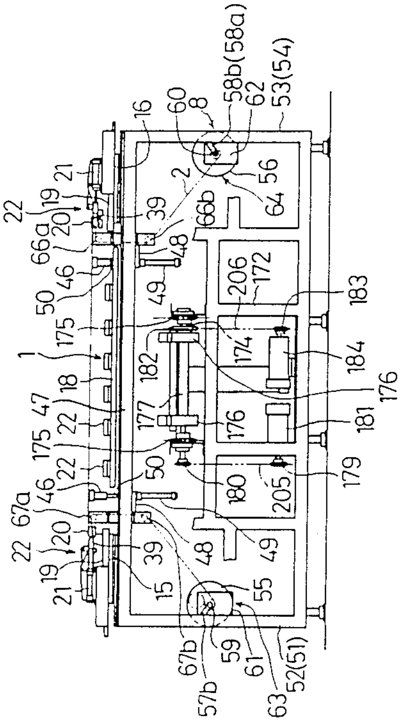
FIG. 3 is an end view of the silk stretch section of FIG. 1.

Referring to FIGS. 1–3, the automatic silk screen stretching apparatus, according to the invention, comprises a cramp apparatus 1 which cramps a silk screen 2 at a predetermined tension, a frame elevator apparatus 3 which supplies a frame 4 from under side of the silk screen 2 which is cramped by the cramp apparatus 1, a frame feed apparatus 5 which feeds the frame 4 intermittently corresponding to the vertical movement of the frame elevator apparatus 3, a frame discharge apparatus 6 which discharges the frame 4 which has a stretched silk, a frame container 7 which receives the frame 4 discharged by the discharge apparatus 6, a silk feed apparatus 8 which feeds the silk 2 to the cramp apparatus 1, an adhesive apply apparatus 10 which applies adhesive on the surface of the frame 4 which is urged upwards by the elevator apparatus 3, a drier apparatus 11 which forcibly dries the adhesive applied on the surface of the frame 4, a cutting apparatus 12 which cuts the silk 2 adhered on the frame 4 along the outer edge of the frame 4, and a movable table apparatus 9 which moves to X and Y directions and supports the apparatus 10, 11 and 12.

The cramp apparatus 1 comprises four sides cramp tables 15, 16, 17 and 18 which are slidable to front and rear directions on four sides support plates 14 which are mounted on a stand 13. On each of the tables 15, 16, 17 and 18, a plurality (six on each table in the drawing) of stretchers 22 are mounted. Each stretcher 22 comprises a silk cramp member 20 and a cylinder 21 to move the cramp member 20 back and forth. In FIGS. 1 and 2 support member 19 which mounts the cylinders 21 are shown on the cramp tables 15, 16, 17 and 18, and the cramp members 20 and the cylinders 21 are eliminated.

Each support plate 14 has left and right guide members 23 and 24 on which slide members 25 and 26 under each of the cramp tables 15, 16, 17 and 18 are slidably engaged. Further, a rack gear (not shown) under each of the cramp tables 15, 16, 17 and 18 and a pinion gear (not shown) on each of the support plates 14 are meshed. A motor (not shown) drives the pinion gear to desired direction to move the cramp tables 15, 16, 17 and 18 back and forth.

Figure 4:
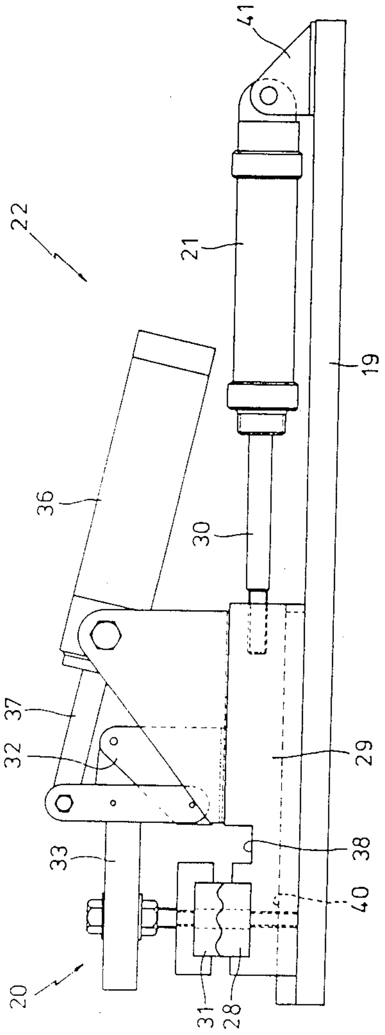
FIG. 4 is an enlarged side view of a silk cramp and stretcher member on the cramp table of the apparatus shown in FIG. 1.
Figure 5:
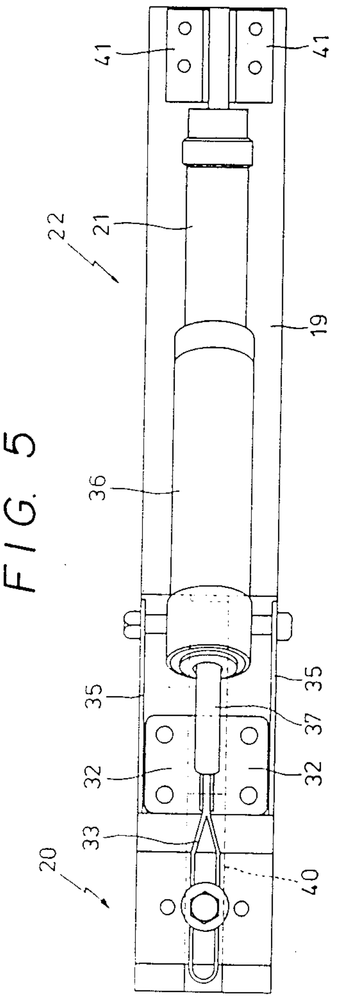
FIG. 5 is a plan view of FIG. 4.

The stretcher 22 is shown in FIGS. 4 and 5 and comprises the cylinder 21 which is mounted on the rear portion of the support member 19 and a lower cramp plate 29 slidably mounted on the support plate 19. The lower cramp plate 29 is connected with a cylinder ram 30 of the cylinder 21 at rear end. The lower cramp plate 29 mounts a lower cramp portion 28 of the cramp member 20. An upper cramp portion 31 cooperating with the lower cramp portion 28 is supported by a support member 33 which is pivotably supported through a pin 34 by a mounting plate 32 which is secured with the lower cramp plate 29. Mounting plates mounted on rear portion of the lower cramp plate 29 pivotably mount a cylinder 36 which has a cylinder ram 37 which is pivotably connected with the support member 33 of the upper cramp portion 31.

On the center portion of the lower cramp plate 29, a recessed portion 38 is formed to engage a silk drawing guide bar 39 shown in FIG. 1. 40 designates a guide for the lower cramp plate 29 and 41 designates a mounting plate of the cylinder 21.

The silk drawing guide bar 39 is mounted, as shown in FIGS. 1 and 2, between cylinder rams 44 and 45 of actuating cylinders 42 and 43 which are mounted on both side end portions of the front and rear cramp tables 15 and 16.

Inner side corner portions of the cramp tables 15, 16, 17 and 18 mount vertically movable pushers 46 for removing looseness of the silk 2.

Each of the pushers 46 is mounted on a vertically movable cylinder 49 which is mounted on a support plate 48 which in turn is mounted on an upper support frame 47 of the stand 13. The pusher 46 is connected with and supported by a cylinder ram 50 of the cylinder 49 as shown in FIG. 3.

The silk feed apparatus 8 which feeds the silk 2 to the above described cramp apparatus 1 will be described. As shown silk-winding rolls 55 and 56 of the silk feed apparatus 8 are rotatably supported between front side frameworks 51 and 52 and rear side frameworks 53 and 54 of the stand 13 by means of support portions 57*a*, 57*b*, 58*a* and 58*b*. Rotating shafts 59 and 60 of the rolls 55 and 56 are connected through transmission gears 63 shown in FIG. 2 with drive motors 61 and 62. Thus, a silk feed portion 64 and a silk winding portion 65 are formed on the front and rear side frameworks 51, 52, 53 and 54 of the stand 13.

On the support plate 14 on the stand 13 and in front of the front and rear cramp tables 15 and 16, upper and lower guide bars 66*a*, 66*b*, 67*a* and 67*b* are bridged. On middle portion of the cramp tables 15 and 16, two pairs of support arms 68*a*, 68*b*, 69*a* and 69*b* are pivotably mounted as shown in FIG. 1. Temples 70 and 71 are mounted on left and right side portions of the front frame cramp table 15.

Figure 10:
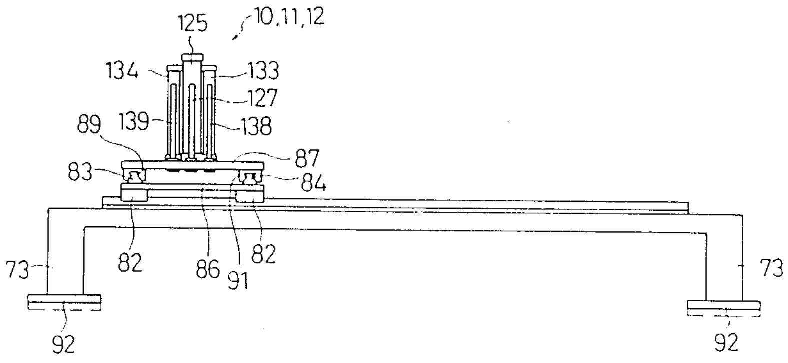
FIG. 10 is a side view of FIG. 9.
Figure 11:
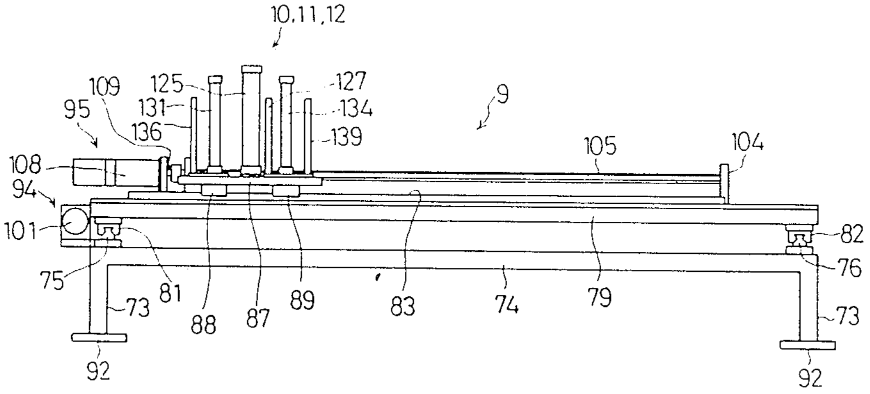
FIG. 11 is an end view of FIG. 9.

The movalbe table apparatus 9 will be described. Each corner of the support plate 14 on the stand 13 of the cramp apparatus 1 mounts a vertical foot frame 73 and a framework 74 to support the movable table apparatus 9 is secured with the foot frame 73. As shown in FIGS. 9, 10 and 11, on both side support frameworks 75 and 76 of the support framework 74 mount guide rails 77 and 78 on which guide members 81 and 82 which are mounted under front and rear ends of front and rear movable support frameworks 79 and 80 are slidably engaged. Thus, the front and rear support frameworks 79 and 80 are movably mounted to bridge the framework 74. The movalbe support frameworks 79 and 80 are connected each other by connect plates 85 and 86 and mount guide rails 83 and 84 on the upper surfaces. On the guide rails 83 and 84, guide members 88, 89, 90 and 91 mounted on the lower surface of a movable talbe 87 are slidably engaged. Thus, the movable table 87 are movable left and right and front and rear in the framework 74. The front and rear support frameworks 79 and 80 and the movable table 87 include drive apparatus 94 and 95 respectively.

The drive apparatus 94 of the support frameworks 79 and 80 comprises bearing plates 96 and 97 which are secured with front and rear end portions of the left support frameword 75 of the framework 74, and a lead screw 98 rotatably supported between the bearing plates 96 and 97. A guide member 100 is secured with a connecting arm 99 projected from the connecting plate 85 of the support frameworks 79 and 80. The guide member 100 has internal thread which engages with the lead screw 98 which is driven by a drive shaft 102 of a drive motor 101 which is mounted on front end side surface of the left support framework 75.

The drive apparatus 95 of the movable table 87 also comprises bearing plates 103 and 104 which are secured with left and right end portions of the side surface of the rear support framework 80, and a lead screw 105 rotatably supported by the bearing plates 103 and 104. A guide member 107 secured with a connecting arm 106 which is projected from rear center portion of the movable table 87 engages with the lead screw 105. The lead screw 105 is driven by a drive shaft 109 of a drive motor 108 which is secured with left side end portion of the rear support framework 80.

As shown in FIGS. 9–11, each vertical foot 73 of the stand 74 is secured with each corner of the support plate 14 through a mounting plate 94 on the stand 13 of the cramp apparatus 1.

On the movable table 87 of the movalbe table apparatus 9, the above mentioned adhesive apply apparatus 10, the drier apparatus 11 and the cutting apparatus 12 are mounted. By displacing the movable table apparatus to X and Y directions the apparatus 10, 11, and 12 move along the upper surface of the frame 4 which is supplied by the elevator apparatus 3.

Figure 12:
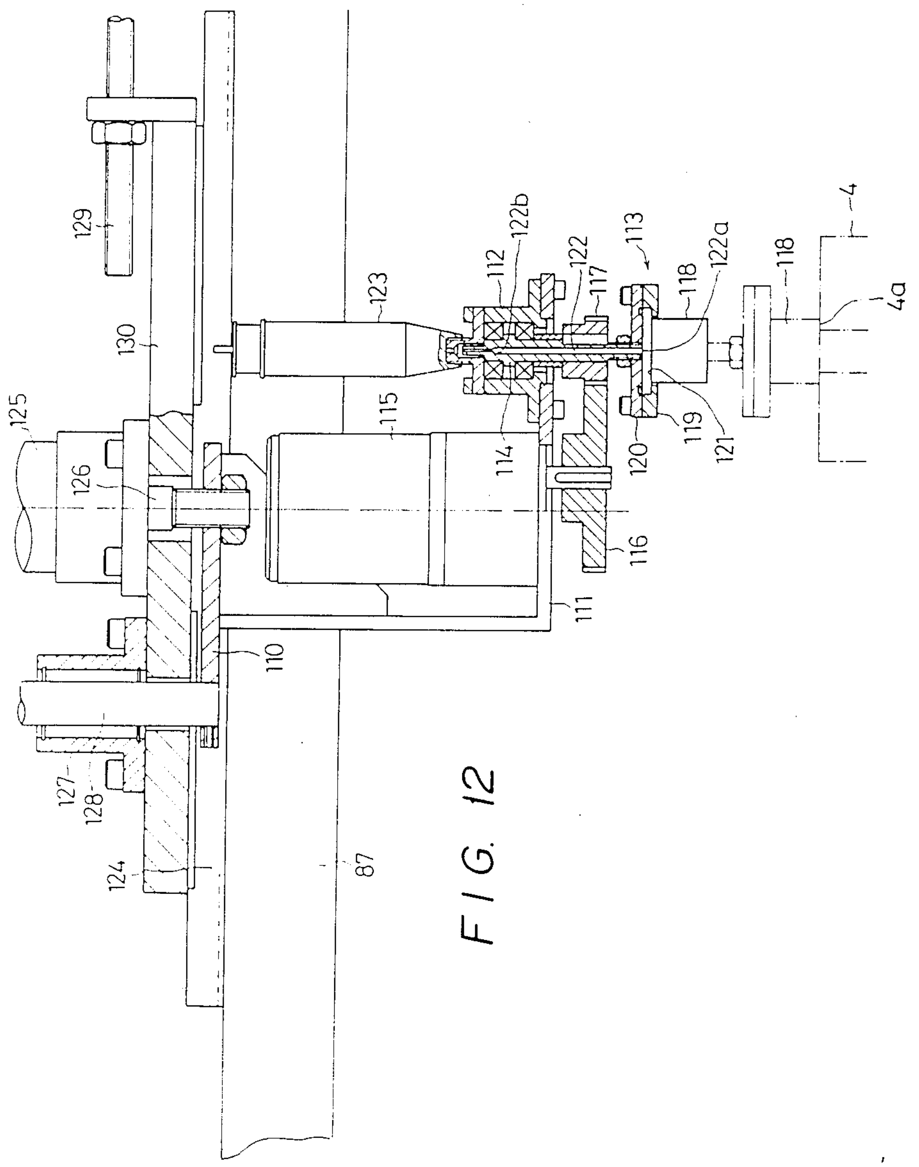
FIG. 12 is an enlarged and partially broken side view of the adhesive apply apparatus shown in FIG. 9.

The adhesive apply apparatus 10 which applies adhesive on the upper surface of the silk support frame 4 will be described referring to FIG. 12.

On the lower side of the movalbe table 87, a support arm 111 is mounted through a vertically movable plate 110. A bearing 112 is mounted on the end of the support arm 111, and rotatably supports a rotatable shaft 114 of a rotary brush 113. A drive motor 115 is mounted on the support arm 111 and includes a drive gear 116 which meshes with a gear 117 of the rotatable shaft 114 to connect the rotary brush 113 with the drive motor 115.

The rotary brush 113 comprises brush 118 mounting plate 119 and a connecting plate 120 which mounts the brush mounting plate 119 and which connects with the rotatable shaft 114. The brush mounting plate 119 forms a recess 121 to receive suitable adhesive. An adhesive supply hole 122 passes through the rotatable shaft 114. The lower end opening 122*a* of the supply hole 122 communicates with the recess 121 and upper end opening 122*b* of the supply hole 122 communicates with a needle valve of an adhesive supply container 123.

The vertically movable plate 110 is connected with a cylinder ram 126 of a vertical operating cylinder 125 which is secured with a fixed plate 124 which is mounted to the movable table 87. The vertically movable plate 110 mounts a guide bar 128 which is guided by a guide portion 127 fixed to the fixed plate 124.

To regulate mounting position of the rotary brush 113 a rotatable shaft 129 operated by a handle (not shown) displaces a movable plate 130 which is movable on the fixed plate 124.

The silk cutting apparatus 12 comprises four vertically operable cylinders 131, 132, 133 and 134, mounted on the movalbe plate 87 through each fixed plate (not shown) as shown in FIG. 9. A cylinder ram (not shown) each of the cylinders 131, 132, 133 and 134 mounts a silk cutter. The cutter is not shown, however, in this case the cutter has unidirectional knife edge. The cutter may be a disc cutter, as desired.

The vertically operable cylinders 131, 132, 133 and 134 have guide bars 136, 137, 138 and 139 respectively to limit vertical movement of the cylinder rams.

The drier apparatus 11 which forcibly dries adhesive applied on the surface of the frame 4 is not shown in detail and has an air nozzle which is vertically movably mounted under the movable table 87 to supply hot blast on the surface of the frame 4.

Above mentioned apparatus forms a silk stretching section of the silk stretching apparatus. Now, a frame handling section will be described.

The frame elevator apparatus 3 comprises a vertically movable table 141 at intermediate portion of a frame conveyor belt 140 which runs between the frame feed apparatus 5 and the frame discharge apparatus 6. The vertically movable table 141 is supported by a cylinder ram 143 of an elevator cylinder 142 which is mounted central portion under the cramp apparatus 1.

The middle portions of the frame elements of the frame 4 urged and supported by support members 144 are mounted on the support plates 144 at center front sides of the cramp tables 15, 16, 17 and 18 to support the frame 4 which is supplied to the cramp apparatus 1 from the frame elevator apparatus 3.

Figure 6:
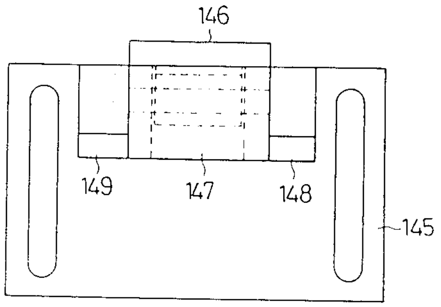
FIG. 6 is an enlarged plan view of an urging and support member to support a frame in the cramp table shown in FIG. 1.
Figure 7:
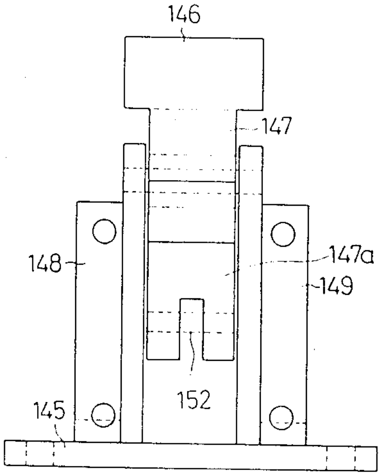
FIG. 7 is an end view of FIG. 6.
Figure 8:
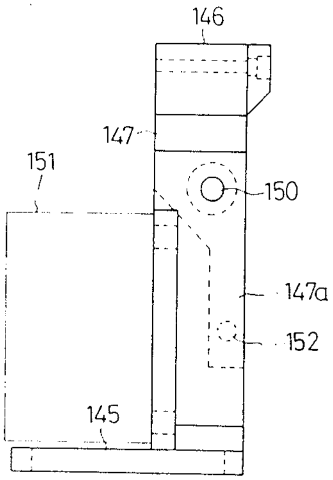
FIG. 8 is a side view of FIG. 6.

The support member 144 is shown in FIGS. 6–8 and comprises a mounting plate 145 which is mounted on a predetermined position of the support plate 14 on the stand 13. The mounting plate 145 has integral support elements 148 and 149 between which an urging arm 147 which has an urging portion 146 at upper end is pivotably supported by a pin 150. The lower end 147*a* of the urging arm is connected by a connected pin 152 with an actuating ram (not shown) of an actuating cylinder 151 which is shown by phantom line in FIG. 8.

The frame feed apparatus 5 feeds a frame 4 intermittently to the frame elevator apparatus 3 by means of the conveyor belt 140. The frame feed apparatus 5 is at upstream position of the conveyor belt 140 and is left side of the stand 13 of the cramp apparatus 1 as shown in FIG. 1.

More particularly, a stand 153 is connected to the left side of the stand 13. A belt pulleys 154 of the conveyor belt 140 are rotatably supported to a left side legs 155 of the stand 153. On front and rear side arms 156 and 157 of the stand 135, opposed frame 4 guide plates 158 and 159 are vertically mounted to support piled up frames 4. The piled up frames 4 are supported by an elevator table 160 and the next frame from lowermost frame 4 is cramped by a cramp apparatus 161. Front and rear sides of the frame 4 are supported by opposed movable plates 164 and 165 which are mounted through vertical support bars 162 and 163 which are mounted on the elevator table 160.

The elevator table 160 is supported by a cylinder ram 167 of an elevator cylinder 166 which is mounted in central position of the stand 153. On the vertically movable plates 164 and 165, a plurality of longitudinally rolling rollers are supported.

The cramp apparatus 161 comprises cramp cylinders 169 which are mounted on the front and rear side arms 156 and 157 of the stand 153. Each of the cramp cylinders 169 has a cylinder ram 170 which mounts a cramp head 171 at the free end of the ram.

The discharge apparatus 6 discharges silk stretched frame 4 from the frame elevator apparatus 3 and is mounted at downstream side of the conveyor belt 140. The dischasrge apparatus 6 comprises a stand 172 which is connected with the right side of the stand 13. On the right side legs 173 of the stand 172, belt pulleys 175 of the conveyor belt 140 is rotatably supported through a rotatable shaft 174. On the shaft 174, a pivot shaft 177 is supported and the pivot shaft 177 carrys frame inverting arms 176 which forms inverting apparatus 178.

The rotatable shaft 174 is connected through a chain wheel 179, a chain 205, and a drive wheel 180 with a drive motor 181, and the pivot shaft 177 is connected through a chain wheel 182, a chain 206, and a drive wheel 183 with a drive motor 181.

The frame container 7 receives the silk stretched frame 4 which is discharged by the discharge apparatus 6, and comprises a stand 185 which is connected with the discharge side of the stand 172 of the discharge apparatus. On left and right legs 186 and 187 of the stand 185 rotatable supports shafts 188 and 189 which have belt wheels 190 and 191 respectively. Between the belt wheels 190 and 191, belts 192 connect the rotatable shafts 188 and 189. On the front and rear side arms 193 and 194, guides 195 and 196 are mounted. A frame support plate 197 which receives and supports vertical positioned frames 4 is slidable to longitudinal direction of the stand 185 through a slide plate 200. The frame support plate 197 mounts guide members 198 and 199 which engages with the guides 195 and 196 and are connected with the belts 192.

A chain wheel 201 is secured with a center portion of the shaft 189 of the belts 192 and is connected through a chain 203 and a drive wheel 202 with a drive motor 204.

The method of stretching silk screen 2 on the frame 4 utilizing the above described silk screen stretching apparatus, according to the present invention, will be described.

In the silk stretching section, the silk supply reel 64 of the silk feed apparatus 8 feed the silk 2 which is stretched through the feed guide bars 66*b* and 66*a*, the draw in guide bars 39 and the guide bars 67*a* and 67*b* to the winding reel 65 to set the silk 2 to the cramp apparatus 1. By the draw in guide bar 39, the front and rear-end portions of the silk 2 between the cramp portions 20 of the stretchers 22 of the front and rear cramp tables 15 and 16, and the left and right side edges of the silk 2 extended between the cramp portions of the stretchers 22 of the left and right cramp tables 17 and 18, except the stretchers 22 of end portions of the cramp tables 15, 16, 17 and 18, is stretched and cramped by actuating the cylinders 36 of the stretchers 22 to pivot the support members 33 about the pins 34 to cramp direction. The upper cramp portions 31 and the lower cramp portions 28 engage each other so that the silk 2 is cramped between the cramp portions 31 and 28.

Then, the pushers 46 move upwards by actuating the cylinders 49 so that only the corner portions of the silk 2 are relaxed and the other portions of the silk 2 are stretched by the cramp portions 20 of the actuating stretchers 22. Then the remaining stretchers 22 at the corner portions are actuated to cramp the corner portions of the silk 2. Then, the pushers 46 are moved downwards.

Cooperating to the cramp actuation of the stretchers 22, the drive motors of the cramp tables 15, 16, 17 and 18 are actuated to move the cramp tables outwards to a predetermined stroke so that first stage stretching of the silk 2 which is cramped by the stretchers 22. As the first stage stretching is completed, the cylinders 21 of the stretchers 22 are actuated so that the lower cramp plates 29 slide outwards on the support members 19. Thus, the cramp portions 20 move outwards to perform second stage stretching of the silk 2 between the stretchers 22. Thus, the silk stretching operation is completed.

Cooperating to the silk stretching operation of the silk stretching section, the frame 4 is supplied from the feed apparatus 5 to the elevator apparatus 3.

In the frame feed apparatus 5, a plurality of empty frames 4 are piled up on the movable plates 164 and 165 (FIG. 2). The elevator cylinder 166 is actuated to move the elevator table 160 upwards to lift all the frames 4. Then, the elevator table 160 moves downwards to a predetermined stroke to place a frame 4 which is next to lowermost frame 4 to a position which is opposed to the cramp apparatus 161.

The elevator table 160 is stopped and the cramp cylinders 169 of all the cramp apparatus 161 are actuated to cramp the opposed frame 4 by the cramp heads 171. All the frames 4 which had been supported by the left and right elevator plates 164 and 165 except the lowermost frame 4 are supported by the cramp heads 171. Then, the elevator table 160 is lowered to lower dead center position so that the lowermost frame is left on the conveyor belt 140 leaving the movable plates 164 and 165 of the elevator table 160.

Next, the conveyor belt 140 is driven by actuating the drive motor 181 to feed the frame 4 on the elevator table 141 of the elevator apparatus 3. The elevator cylinder 142 of the elevator table 141 is actuated to lift the elevator table 141 so that the frame 4 on the elevator table 141 reaches to the cramp apparatus 1. By upward movement of a predetermined stroke of the elevator cylinder 142, the frame 4 is urged to the silk 2 which is stretched by the stretchers 22.

When the elevator table 141 is at upper dead center position, the frame 4 is opposed to the support members 144. Cooperating to the upward movement of the elevator table 141 to the upper dead center position, the operating cylinders 151 are actuated to move the lower end portions 147*a* of the urging arm 147 inwards shown in FIGS. 6–8, to pivot the urging arms 147 about the pivot pins 150 so that the center positions of all the arms of the frame 4 is urged by the urging portions.

The support members 144 may support the frame 4 by forcibly deforming center portions of the arms of the frame 4 against the elasticity of the arms.

As the above mentioned operation is completed, the drive apparatus 94 and 95 of the movable table 87 of the movable talbe apparatus 9 is actuated by a numerical controlled control apparatus (not shown) to drive the movable table 87 to predetermined values to X and Y directions. Thus, a predetermined working head on the movable table 87 move pricisely along the four arms of the frame 4 sequentially.

At first, the brush 118 of the adhesive apply apparatus 10 is positioned on one corner of the frame 4 by moving the movable table 87. The vertical operating cylinder 125 of the adhesive apply apparatus 10 is actuated to lower the support arm 111 at predetermined stroke so that the brush 118 of the rotary brush 113 is engaged with the corner of the frame surface 4*a* of the frame 4 as shown in phantom line in FIG. 12.

Suitable adhesive is supplied from the supply needle valve 123 through the supply hole 122 of the rotatable shaft, the recess 121 to the brush 118 of the rotary brush 113. The drive motor 115 is actuated to rotate the rotary brush 113. Thus, by predetermined programmed movement of the movalbe table 87, all frame surfaces 4*a* of the arms of the frame 4 with the silk 2 stretched on the frame 4 is applied adhesive to a predetermined width.

When the adhesive apply process is completed, the motor 115 is stopped and the cylinder 125 is actuated to return the brush 118 to original position. The adhesive supply needle valve 123 is also closed. Then, the drier nozzle of the drier apparatus 11 is positioned on the corner of the frame 4 by suitable moving of the movable plate 87, and is actuated while the above mentioned scanning of the movable plate 87 along the arms of the frame 4. Thus, the silk 2 contacting with the frame surface 4*a* is adhered by the cured adhesive.

After the adhesive is forcibly dried, the cylinders of the cramp portion 20 are released to release the second stretching of the silk 2. Then, the movable table 87 is moved to position the first cutter of the cylinders 131, 132, 133 and 134 of the cutting apparatus 12 on one corner of the outer periphery of the arm of the frame 4. Then, the associated cylinder is lowered and the movable table 87 moves to cut the silk 2 on the outer periphery of the arm of the frame 4. The cylinder and the cutter are retracted to original position and the movable table 87 is repositioned to align the second cutter of the cylinders 131, 132, 133 and 134 on the second corner of the outer periphery of the second arm of the frame 4. Then, the associated cylinder is actuated to lower the cutter to the corner and the movable table 87 moves along the outer edge of the second arm of the frame 4 to cut the silk 2. The sequence is repeated to cut the silk 2 from all outer edge of the arms of the frame 4 by above mentioned unidirectional cutters.

As the cutting operation is completed, the urging force of the support members 144 is released and the elevator table 141 with the silk stretched frame 4 is lowered to lower dead center position of the elevator cylinder 142. The silk stretched frame 4 is left on the conveyor belt 140.

The conveyor belt 140 is driven predetermined distance to discharge the silk stretched frame 4 on the pibotable arms 176 of the discharge apparatus 6 and an empty frame 4 is supplied on the elevator table 141 as described before.

The drive motor 184 of the discharge apparatus 6 is actuated to turn the pivotable arms 176 to the pahntom position shown in FIG. 2 to turn the frame 4 about 90° which is transported by the conveyor belt 192 of the storing apparatus 7.

The frame 4 which is transported to the container apparatus 7 is supported and stored in vertical position by the frame support plate 197. When one frame 4 is arrived to the container apparatus 7, the drive motor 204 is actuated to drive the belt 192 so that the slide plate 200 retracts a predetermined value through the guides 195 and 196 to clear a space to receive next vertical frame 4 from the now stored frame 4.

When the conveyor belt 140 is driven to discharge the silk stretched frame 4, the frame feed apparatus 5 prepares the lowest frame 4 on the conveyor belt 140 as mentioned before. Thus, an empty frame 4 arrives on the elevator table 141 of the elevator apparatus when the silk stretched frame 4 arrives to the discharge apparatus 6.

As the silk stretched frame 4 is lowered by the elevator apparatus 3, in the cramp apparatus 1, the cramp table 15, 16, 17 and 18 are moved inwards to original positions, and the cylinders 36 of the stretcher 22 are actuated to release cramp of the silk 2 at the cramp portions 20. The support arms **68*a*, 68*b*, 69*a* and 69*b* are turned to the operating position shown by phantom lines in FIG. 1 to support the cut silk 2. The silk 2 is wound by actuating the winding motor 61 of the winding portion 65 to rotate the winding roll 55. A detecting device (not shown) detects the cut portion of the silk 2 to start and stop the winding device 65. Thus, the silk 2** is prepared to next stretching operation.

The above described sequence is automatically repeated to stretch the silk 2 to the desired number of frames 4.

The supply of the empty frames 4 to the feed apparatus 5 and the removing of the silk stretched frames 4 from the container apparatus 7 may be performed manually or may be performed by suitable means automatically.

It will be appreciated that the silk stretching method and apparatus according to the present invention perform silk stretching operation to the frame quickly and automatically without irregularity of stretching so that working efficiency is greatly improved.

Conventionally, the silk stretching has been performed manually. The present invention provides for the first time new automatic silk stretching method and apparatus.

The second embodiment of the present invention is shown in FIGS. 13 and 14. In this embodiment, a silk urging apparatus 300 is added to firmly press the silk 2 on the frame surface **4*a* of the frame 4, and a cutting apparatus 500 having one unit rotary cutter is provided in place of the cutting apparatus 12 having four unidirectional cutters. Other construction is similar with that shown in FIGS. 1–12** so that same reference numeral is used to show same part or portion through all embodiments for sake of clarity.

As the modified apparatus 300 and 500 are mounted on the movable table apparatus 9, only the movable table apparatus 9 will be described in detail referring to the FIGS. **13*a*, 13*b* and 14**.

The urging apparatus 300 comprises a cylinder 303 which is mounted on a table 302 which is secured with the upper surface of the movable table 87 through rods 301. A support rod 305 is vertically movably and rotatably supprted by the cylinder 303 through a rotary joint 304. The free end of the rod 305 mounts an urging roller 306 having a plurality of rotatable rollers 307.

The support rod 305 is rotatably supported by a bearing 307 on the movable table 87. A gear 308 connected with the support rod 305 is driven by a drive motor 309 through a drive gear 310.

The cutting apparatus 400 comprises a cylinder 401 mounted on the stand 302 and a support rod 403 which is vertically movably and rotatably supported by the cylinder 401 through a rotary joint 402. On the free end of the support rod 403 a cutter 404 is secured. On the movable table 87 a bearing 405 supports the support rod 403. A gear 406 connected with the support rod 403 is driven by the drive motor 309 through the drive gear 310. In the retracted position of the cutter 404, a cylindrical cover 407 encloses the cutter 404.

A heater 500 of the drier apparatus 11 is shown in FIGS. **13*b* and 14. The adhesive apply apparatus 10 is also shown to clarify relative positions of the elements on and below the movable plate 87**.

After the silk 2 is cramped and stretched by the cramp apparatus, the movable table 87 scans the frame 4 to perform adhesive application by the adhesive apply apparatus 10 and forcibly drying the adhesive by the drier apparatus 11, described in the first embodiment, the movable table 87 of the movable table apparatus 9 positions the roller 306 on one corner of the frame 4. Then, the cylinder 303 is actuated to lower the support rod 305 to engage the urging roller 306 on the corner of the frame 4. In this position, the direction of the roller 306 is to roll along one arm of the frame 4 by the movable table 87. Then, the movable table 87 moves to the direction of the arm of the frame 4 so that the silk 2 is forcibly urged on the frame surface.

When one arm of the frame 4 is urged, the cylinder 303 is actuated to lift the support rod 305 with the urging roller 306, and the drive motor 309 is actuated to rotate the support rod 305 (90°) to direct the urging roller to the direction of next arm of the frame 4. Then, the cylinder 303 is actuated to lower the support rod 305 with the urging roller 306, and the movable table 87 scans the next arm of the frame 4. The sequence is repeated by changing the direction of the urging roller 306 at every corner of the frame 4 and the moving table scans the whole frame surface **4*a* of the frame 4. As desired the urging operation may be repeated on the same surface of the frame 4**.

After the urging operation of the silk 2 onto the frame surface **4*a* of the frame 4 is completed, the cylinder 303 is actuated to retract the support rod 305 and the urging roller 306 upwards. Then, the cutting apparatus 400** is actuated.

The movable table 87 positions the cutter 404 of the cutting apparatus 400 on outer periphey of one corner of the frame 4, and the cylinder 401 is actuated to lower the cutter 404 along the outside of the outer edge of the selected corner of the frame 4.

The direction of the cutter 404 has determined by the drive motor 309 which turns the support rod 403 through the gears 310 and 406 to direct the cutting edge of the cutter 404 to moving direction of the movable plate 87. Then, the movable plate 87 moves to cut the silk 2 along one edge of the frame 4. Then, the support rod 403 is lifted by the cylinder 401 and the drive motor 309 turns the support rod 403 for angle 90°. The movable plate 87 positions the cutter 404 to the next corner of the frame 4 and the cylinder 401 lowers the cutter 404. The movable plate 87 moves along the next edge of the frame 4 and the cutter 404 cuts the silk. The sequence is repeated until the whole outer edges of the frame 4 are separated from surrounding silk. Consequently, one cutter 404 can cut the silk from whole periphery of the frame 4, without using four cutters of the first embodiment.

The rolling direction of the urging roller 306 and cutting direction of the cutter 404 can be changed by the drive motor 309 through the drive gear 310 and the gear 308 and 406 to turn the support rods 305 and 403 for a predetermined angle. In this case, the frame 4 is rectangular or square, so that when the movable plate 87 changes the moving direction at each corner of the four arms of the frame 4, the urging roller 306 or the cutter 404 must change the direction for angle 90°.

Figure 13B:
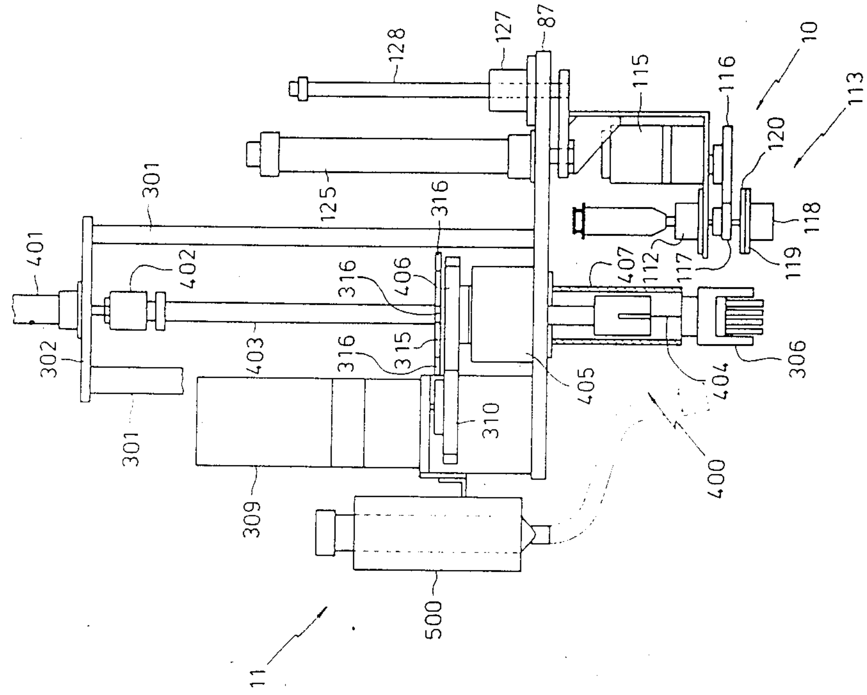
Figure 13A:
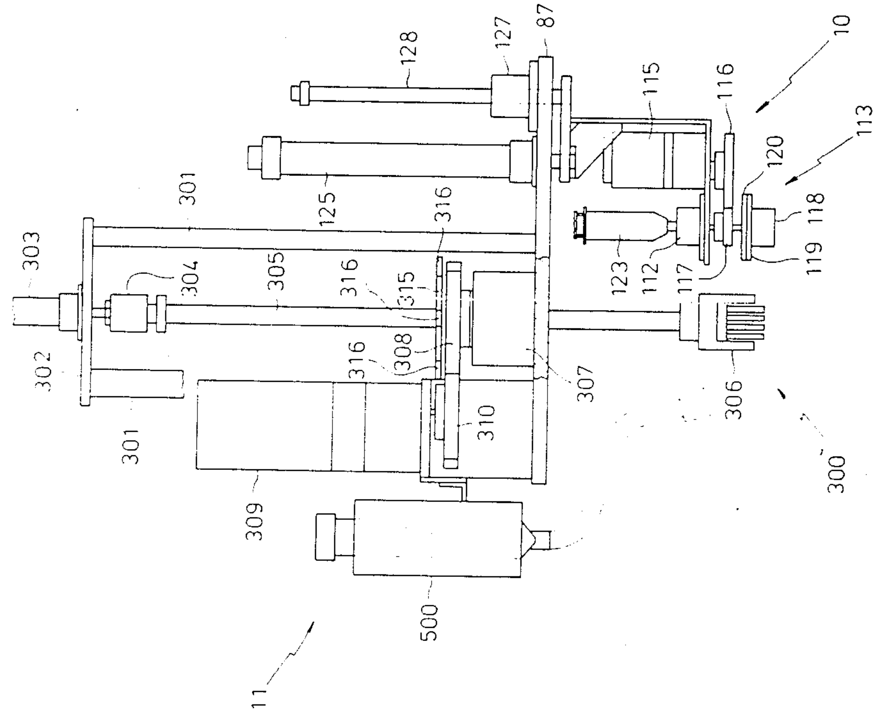

One embodiment to control the 90° direction change of the roller 306 and the cutter 404 is shown in FIGS. 13*a*, and 13*b* and 14. When the movable table 87 moves in one direction, e.g. X direction to the end of the arm of the frame 4, a moving end signal actuates the cylinder 303 or 401 to lift the support rod 305 or 403. Further, the signal actuates the drive motor 309 to turn the support rods 305 and 403. Rotary blades 315 and 415 having 90° spaced four projections 316 and 416 respectively are secured with the support rods 305 and 403 respectively. Proximate switches 317 and 417 are mounted on a support member 320 mounted between the legs 301 and adapted to detect the projections 316 and 416 respectively. The switches 317 and 417 stop the drive motor 309 when desired angle to direct the roller 306 or the cutter 404 is obtained. Thus, the roller 306 and the cutter 404 sequentially change the direction in relation to the movement of the movable table 87. The direction change control of the urging roller 306 and the cutter 404 may be performed mechanically, because the corners of the frame 4 are fixed points relative to the apparatus.

In this embodiment, the silk 2 is adhered witout irregularity. Only one cutter can be used in place of four cutters in the first embodiment.

The third embodiment of the present invention will be described referring to FIGS. 15–18.

In the first embodiment shown in FIGS. 1–12, the elevator table of the elevator apparatus 3 only acts to place the frame 4 and positioning facility of the frame 4 is performed by the support members 144 mounts on inner edge of the cramp tables 15, 16, 17 and 18.

In this embodiment the frame 4 is supported and cramped on the elevator table 141.

A plurality of strain pawls 600 are mounted on each edge member 141*a* of the elevator table 141. The pawls 600 are mounted at same space on the edge member 141*a* through each C shaped guide plate 601 which is mounted on the edge member 141 so as to be reciprocatable along an axis which is perpendicular with the longitudinal direction of the edge member.

An air cylinder 603 for each pawl 600 is mounted on a support member (not shown) which is secured with the edge member 141*a* of the elevator table 141 and has a cylinder ram 604 projected outwards from the edge member 141*a*. Each ram 604 is supported by a bearing 602 mounted on the edge member 141*a* as shown by phantom line in FIG. 18, and has a support bolt 605 which secures the pawl 600 with the ram 604.

A plurality of support plates 606 project inwards from the edge member 141*a* to support the frame 4.

Before the frame feed apparatus 5 feeds a frame 4 on the conveyor belt 140, the air cylinders 603 are actuated to move the pawls 600 outwards to inoperative position.

When the frame 4 is supplied from the frame feed apparatus 5 on the elevator table 141, the air cylinders 603 are actuated to move the pawls 600 inwards by guiding of the guide plate 601 so that each arm of the frame 4 is urged and elastically deformed inwards. Thus, the frame 4 is cramped and supported by the elevator plate 141 through the pawls 600.

The supported frame is lifted upwards by the elevator apparatus 3 and is underside of the stretched silk 2 at the cramp apparatus 1. The silk stretch process is similar with that described in the first embodiment. After the silk 2 is adhered and cut as described, the elevator table 141 is lowered still cramping the silk stretched frame 4. Then, the air cylinders 603 are actuated to release the pawls 600 from the frame 4 and the released frame 4 is discharged by the discharge apparatus 6.

In this embodiment, the frame 4 is supported precisely on the elevator table 141, so that accurate positioning of the frame 4 is performed, and accurate inward deformation is given to each arm of the frame to obtain desired stretching of silk when the frame is silk stretched and is delivered to the discharge apparatus.

We claim:

1. An apparatus for stretching silk on a silk screen printing frame comprising:

a silk cramp apparatus having four side cramp tables surrounding the frame and inwardly and outwardly slidably supported, and a support stand slideably supporting said cramp tables, a plurality of cramp members mounted on each cramp table and each having a silk cramp means and means for moving the cramp members inwardly and outwardly relative to a corresponding cramp table in a horizontal direction independently of each other, a frame elevator apparatus for urging the frame into contact with the silk from a lower side of the silk cramped by the cramp apparatus, an adhesive applying apparatus for applying adhesive to the upper surface of the urged frame, a dryer apparatus for forcibly drying applied adhesive on the frame, and a cutting apparatus for cutting the silk along the outer periphery of the frame.

* * * * *